Aug. 12, 1958 P. DANIELSSON 2,846,716
FISH EVISCERATING MACHINE
Filed Oct. 7, 1955 3 Sheets-Sheet 1

Inventor
Paul Danielsson
by Sommers & Young
Attorneys

Aug. 12, 1958  P. DANIELSSON  2,846,716
FISH EVISCERATING MACHINE
Filed Oct. 7, 1955  3 Sheets-Sheet 3

Inventor
Paul Danielsson
by Sommers & Young
Attorneys

_United States Patent Office_

2,846,716
Patented Aug. 12, 1958

2,846,716
FISH EVISCERATING MACHINE

Paul Danielsson, St. Essingen, Sweden, assignor to Arenco Aktiebolag, Stockholm, Sweden, a Swedish joint-stock company Application October 7, 1955, Serial No. 539,237

Claims priority, application Sweden October 18, 1954

5 Claims. (Cl. 17—3)

This invention relates to improvements in the eviscerating of fish and it is an object of the invention to make provision for the removal of the gills and possibly also other portions of the viscera without the use of pinchers or reciprocating means. Another object of the invention consists in the combination of a rotary gill removing spit with simple and effective means for finishing the operation of said spit. Still another object of the invention consists in the combination of a screw-shaped fish eviscerating spit with simple means facilitating its gill removing action and a further object of the invention consists in the arrangement of such means to protect the gullet of the fish when making an incision in the belly of the fish and cutting the branchial arch.

With these and other objects not specifically mentioned, in view, my invention consists of certain novel features of construction, combination and arrangements of parts, as will be hereinafter described and particularly set forth in the claims hereunto appended.

In the drawings, in which like characters of reference indicate the same or corresponding parts:

Figure 1:
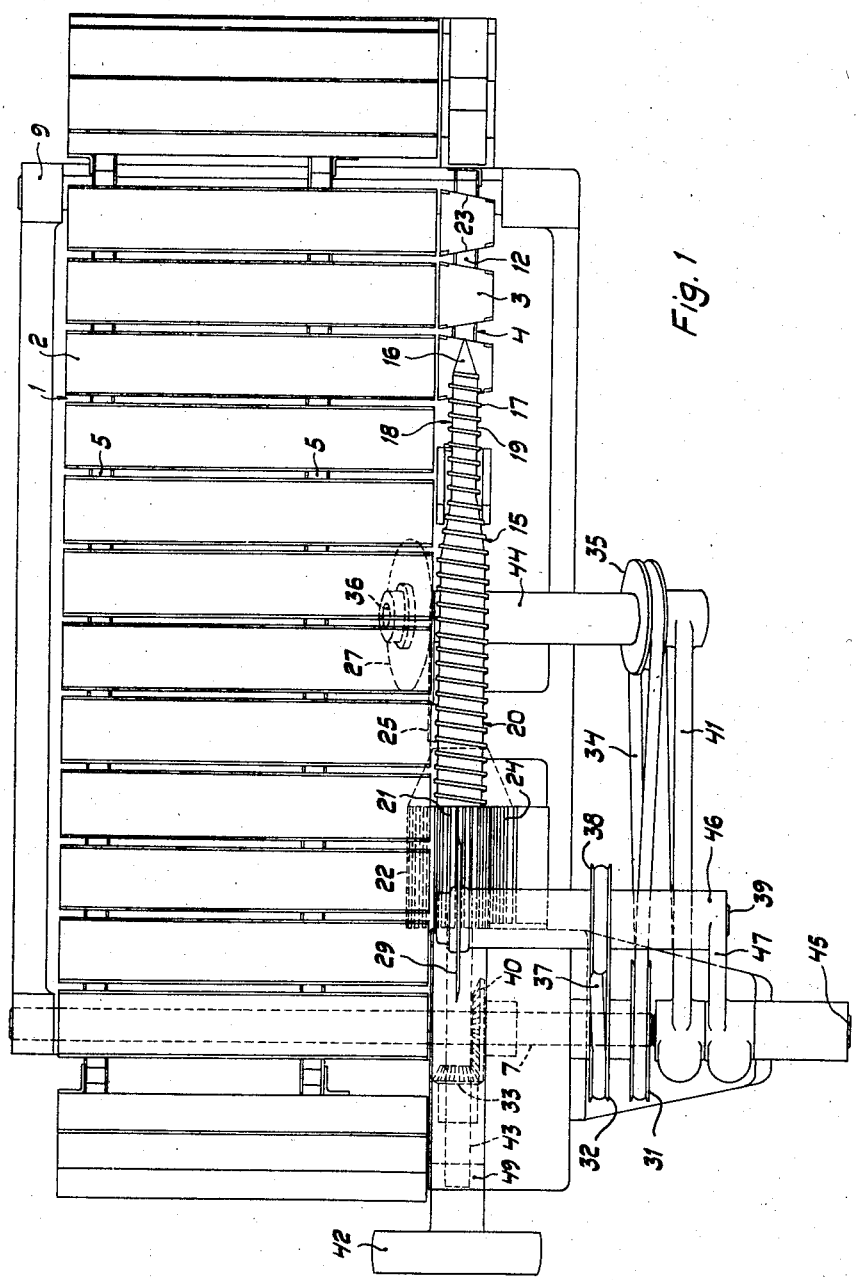
Fig. 1 is a plan view and Fig. 2 is a side elevational view of a machine embodying the invention.

The fish A are fed laterally by a conveyor 1 having pockets 2 in which the fish are placed, belly down, whereby their heads are supported by pockets 3 of a smaller conveyor 4 extending parallel to the conveyor 1. The conveyor 1 has a pair of chains 5, which run over sprockets 6, secured to a shaft 7 and over sprockets 8 secured to a shaft 9 rotatably journalled in the machine frame 10. To the shaft 9 is also secured a driving sprocket 11 for the short chain 12 of the conveyor 4, which chain runs over a sprocket 13, secured to a shaft 14 freely rotatably journalled in the machine frame.

The side walls of the pockets 3 have openings 23 for the free conical end 16 of a spit 15 rotatably journalled in a bracket 49. The spit 15 extends parallel with the conveyor 1 alongside of same and its free pointed end 16 is directed oppositely to the fish feeding direction. The spit 15 has behind its free end 16 a relatively narrow portion 18 provided with square threads 17 with a relatively wide groove 19 therebetween. Behind the portion 18, that is further in the fish feeding direction, the spit has another threaded portion 20 having a larger diameter than the portion 18. The threads of said spit portion 20 have the same pitch as in the portion 18. Further in the fish feeding direction the spit has a roll-shaped extension consisting of a toothed cylindrical portion 21 meshing with a toothed roll 22 having a frusto-conical end 48. Alongside of the gap between the toothed portion 21 and the roll 22 extends another toothed roll 24 meshing with the roll 22.

Figure 3:
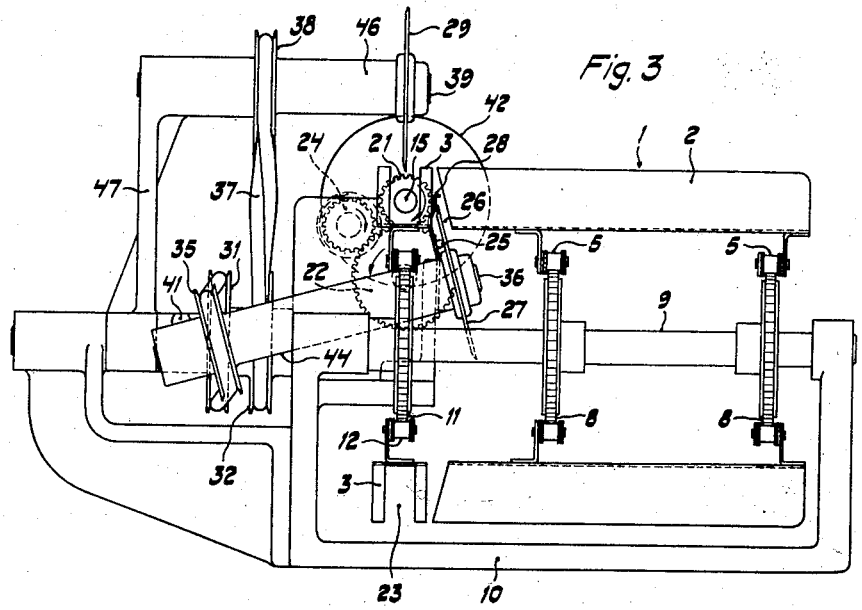
Fig. 3 is a cross sectional view taken on the line III—III of Fig. 2.

Alongside of the larger portion 20 of the spit 15 extends a guide or guard plate 25 the upper portion of which is positioned adjacent to the spit so that the spiral groove 19 of said spit 15 will, in front of said guard plate portion, form a substantially closed helicoidal channel. In the interspace 26 (Fig. 3) between the pockets 2 and the guard plate 25 is positioned obliquely a circular cutter 27 in such a position that the upper portion of its edge is positioned below a horizontally extending gullet-supporting flange 28 on the upper edge portion of guard plate 25. A vertical circular cutter 29 is provided above the toothed portion 21 of the spit 15.

Figure 2:
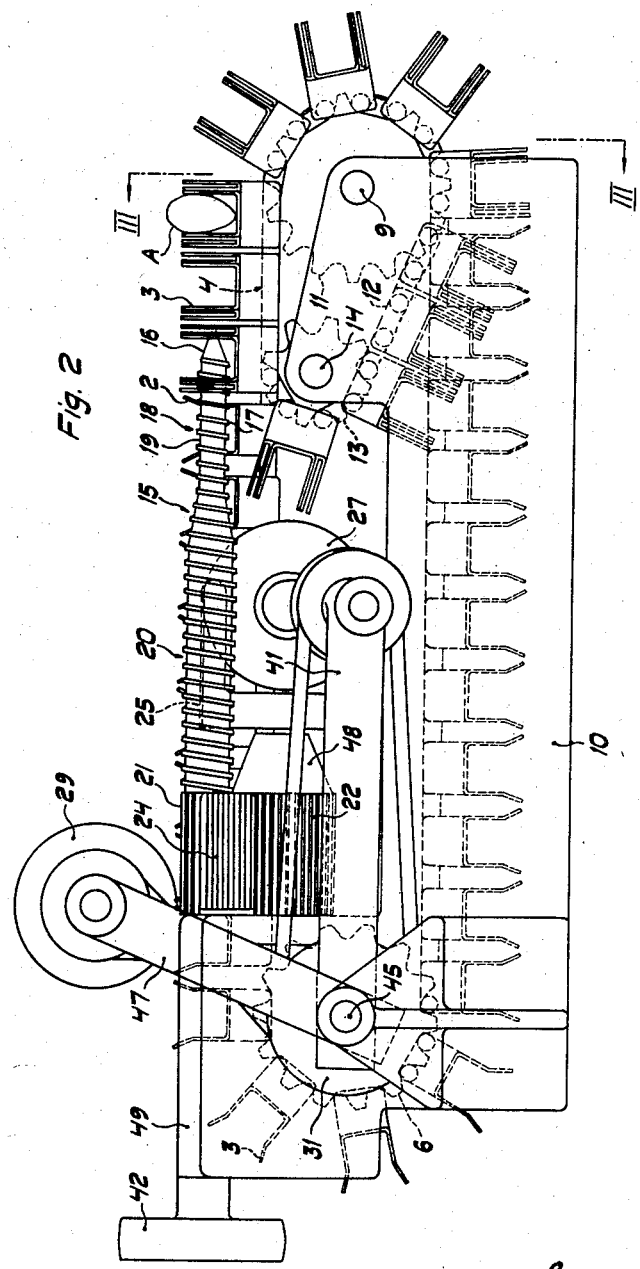

The various members of the machine are driven by a belt pulley 42, secured to the spit 15. The spit 15 drives by means of its toothed portion 21 the toothed roll 22 to the shaft 43 of which is secured a bevel gear 33 meshing with another bevel gear 40, secured to the shaft 7. Two rope pulleys 31 and 32 are secured to the shaft 7 which by means of the pulley 31 and a rope 34 drives another rope pulley 35, secured to a shaft 36 to which the circular cutter 27 is attached. The shaft 36 is rotatably mounted in a hub 44 on an arm 41, which is angularly adjustably secured to a rigidly mounted shaft 45. The pulley 32 drives by means of a rope 37 another pulley 38 secured to a shaft 39 to which the circular cutter 29 is attached. The shaft 39 is rotatably mounted in a hub 46 on an arm 47 which is turnably adjustably secured to the shaft 45 to be set in any desired angular position. The spit 15 has, according to Figs. 1 and 2, left-hand threads and is adapted to rotate in a clockwise direction (Fig. 4) when viewed in a direction towards the free end 16 of the spit, which involves that the spit exercises an impelling action upon the fish in the direction of movement of the conveyor 1 when it has penetrated the fish.

Figure 4:
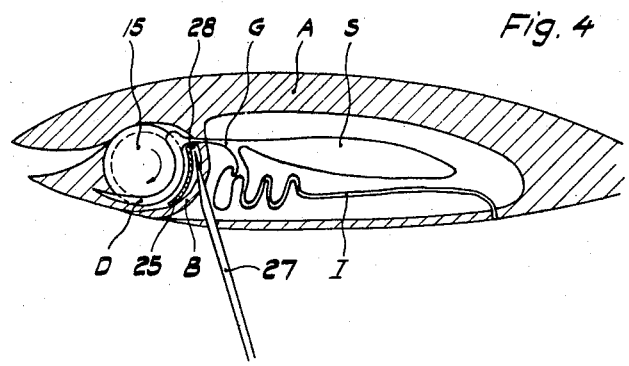
Fig. 4 is a diagrammatic longitudinal section of a fish and illustrates the mode of operation of the eviscerating means.

The advancing fish engage, by their gill covers, the pointed end 16 of the spit 15 so that the gill covers will be bent aside when the spit end enters the gill opening (Fig. 4). When the larger portion 20 of the spit enters the gill opening the gills D will be forced downwardly and are received in the groove 19 of the spit whereby they are subjected to a pulling action downwardly in the rotary direction of the fish (Fig. 4). This pulling action will by the gullet G, supported by the flange 28 of the guard plate 25 be transmitted to the abdomen sack S and the gut I. As the fish has at its belly side been cut by the cutter 27, which also cuts the branchial arch B, the screw-shaped spit 15 will by its rotation pull the gills D out of the partly cut head end of the fish. Thereby the gullet G and the abdomen sack S will follow the gills together with the gut I which is torn off the body of the fish. If desired, the cutter 29 may make an incision in the back of the head of the fish so that the fish head will be severed. If the cutter 29 is not to be used the arm 47 is swung to the left (Fig. 2) so that said cutter will be positioned above the path of the fish.

I claim:

1. In a fish eviscerating machine, a spit having a free end and provided with screw threads, a conveyor extending alongside of said spit to feed the fish conveyed thereby laterally into position to be threaded by their gill openings onto said free end of said spit, and means drivingly interconnecting said conveyor and said spit for rotating said spit to cause the screw-threads thereof to lead the fish laterally in synchronism with said conveyor and to pull, by its rotary movements, the gills and viscera out of the body of the fish.

2. In a fish eviscerating machine, a spit having a free end and provided with screw threads, a conveyor extending alongside of said spit to feed the fish laterally into position to be threaded by their gill openings onto said free end of said spit, means drivingly interconnecting said conveyor and spit for rotating said spit to cause the screw threads thereof to lead the fish laterally in synchronism with said conveyor and to pull, by its rotary movements, the gills and viscera out of the body of the fish, said spit having two coaxial portions of different diameters, one of said portions extending between said free end of said spit and the other portion and having a smaller diameter than said other portion, and the screw threads of both said portions having the same pitch.

3. In a fish eviscerating machine, a spit having helical threads on its outer surface and having a free end, a conveyor extending alongside of said spit to feed fish conveyed thereby laterally into position to be threaded by their gill openings onto said free end of said spit, means drivingly interconnecting said conveyor and spit for rotating said spit to cause the screw threads thereof to lead the fish laterally in synchronism with said conveyor and to pull, by its rotary movements, the gills and viscera out of the body of the fish, and a guide member extending alongside of and adjacent to the screw threads of said spit to keep the gills, pulled by said threads in their rotary direction in the groove between said helical threads.

4. In a fish eviscerating machine, a spit provided with screw threads on its outer surface and having a free end, a conveyor extending alongside of said spit in position to feed fish conveyed thereby laterally into position to thread said fish by their gill openings onto said free end of said spit, and means drivingly interconnecting said conveyor and said spit for rotating said spit to cause said screw threads to feed the fish laterally in synchronism with said conveyor and to pull, by its rotary movements, the gills and viscera out of the body of the fish, said spit having a roll-shaped extension behind said screw threads, another roll extending alongside of said extension and being positioned to operatively cooperate therewith to continue and finish the pulling action upon the gills of said fish.

5. In a fish eviscerating machine, a spit provided with helical screw threads on its outer surface and having a free end, a conveyor extending alongside of said spit in position to feed fish conveyed thereby laterally into position to be threaded by their gill openings onto said free end of said spit, means drivingly interconnecting said conveyor and spit for rotating said spit to cause said screw threads to lead the fish laterally in synchronism with said conveyor and to pull, by its rotary movements, the gills and viscera out of the body of the fish, a guide member having an upper laterally extending gullet supporting flange and extending alongside of and adjacent to said screw threads of said spit to keep the gills, pulled by said threads in their rotary direction, recessed in the helical groove between said threads, and cutter located beneath said flange to make an incision in the belly of the fish and sever the branchial arch thereof.

References Cited in the file of this patent
UNITED STATES PATENTS

| | | |
|---|---|---|
| 1,748,249 | Skoverski | Feb. 25, 1930 |
| 2,527,802 | Dwyer | Oct. 31, 1950 |
| 2,529,920 | Danielsson | Nov. 14, 1950 |